3,029,543
FISHING LINE CONTROL ATTACHMENT
FOR FISHING RODS
Robert A. Budd, 1216 Akers Ave., Jeffersonville, Ind.
Filed Feb. 12, 1960, Ser. No. 8,356
5 Claims. (Cl. 43—25)

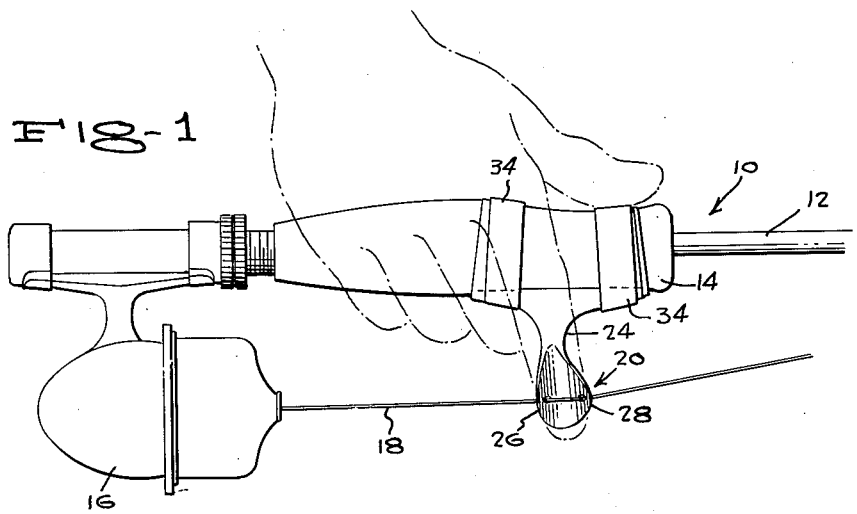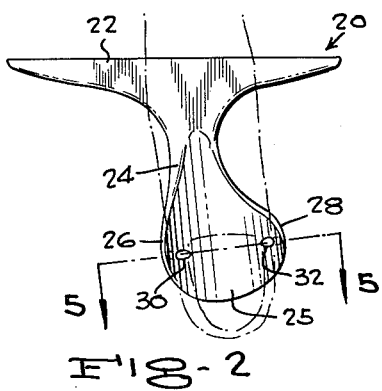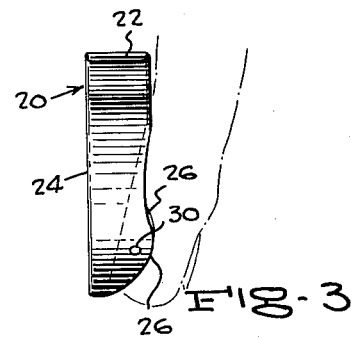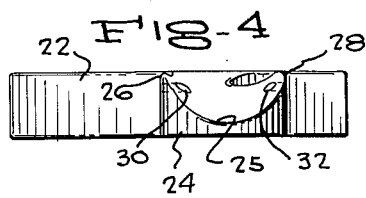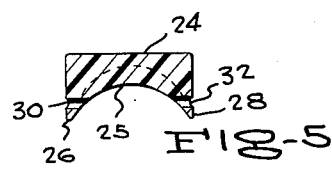

This invention relates to sporting equipment and, more specifically, the instant invention pertains to an attachment for a fishing rod.

One of the primary objects of this invention is to provide an attachment for a fishing rod for controlling the paying out of a fishing line from a fishing reel.

Another object of this invention is to provide a fishing line control attachment for a fishing rod or pole equipped with a closed face spinning reel.

A still further object of this invention is to provide a fishing line control device for fishing rods equipped with a closed face spinning reel wherein the attachment affords the user digital control over the line during casting thereby insuring greater accuracy in placing the bait at the desired site.

This invention contemplates, as a still further object thereof, the provision of an attachment of the type generally referred to supra, the attachment being non-complex in construction and assembly, inexpensive to manufacture and maintain, and which is durable in use.

Other and further objects and advantages of the present invention will become more evident from a consideration of the following specification when read in conjunction with the annexed drawing, in which:

FIGURE 1 is a side elevational view of a conventional fishing rod equipped with a closed face spinning reel and the control attachment for the fishing line constructed according to this invention;

FIGURE 2 is an enlarged side elevational view of the attachment illustrated in FIGURE 1;

FIGURE 3 is an end elevational view of the attachment;

FIGURE 4 is a bottom plan view of the attachment; and,

FIGURE 5 is a detail cross-sectional view of the attachment, FIGURE 5 being taken substantially on the inclined plane of line 5—5 of FIGURE 2, looking in the direction of the arrows.

Referring now more specifically to the drawing, reference numeral 10 designates, in general, a fishing rod having a ferrule 12 provided with a conventional handle portion 14 at one end thereof. To the outer end of the handle 14 is connected, by conventional means, a closed face spinning reel 16 carrying a fishing line 18.

The attachment to which this invention is addressed is designated, in general, by the reference numeral 20. As is seen in the several figures of the drawing, the attachment 20 is substantially T-shaped in configuration and includes a crosshead 22 from which depends, intermediate its ends, a downwardly extending outwardly flaring stem 24.

As is seen in the drawing, the stem 24 is asymmetrical about its longitudinal axis and has a lobe-shaped configuration. The stem 24 is formed with an axially extending arcuate recess 25 to form a pair of arcuately shaped outwardly diverging side walls 26, 28 which, at points spaced inwardly from the lower end of the stem 24, are each formed with a transversely extending fishing line passageway 30, 32, respectively, the passageways 30, 32 being coaxial with respect to one another.

The ends of the crosshead 22 are taped to the handle 14 as at 34 (other securing means could be used, of course) so that the stem 24 depends therefrom substantially in the normal path of the fishing line 18. The line 18 is threaded through the aligned passageways and the rod is then strung in the conventional manner. Preferably, the stem 24 is placed about four to six inches beyond the closed face of the reel 16.

With the attachment 20 in place, the forefinger of the user may be engaged within the recess 25 to clamp the line 18 against the adjacent portion of the stem 24 during casting, or the finger may be lightly engaged against the line to cause a slight friction drag thereon whereby the cast bait may be feathered to lend greater accuracy in the placing thereof in the desired site.

Having described and illustrated one embodiment of this invention in detail, it will be understood that the same is offered merely by way of example, and that this invention is to be limited only by the scope of the appended claims.

What is claimed is:

1. An article of manufacture comprising a substantially T-shaped member having a crosshead and a stem depending therefrom, said stem having an axially-extending arcuate recess at one side thereof to provide a pair of opposed side walls, and each of said side walls adjacent the outer end of said stem having a passageway formed therein and extending transversely through each of said side walls.

2. An article of manufacture comprising a substantially T-shaped member having a crosshead and a stem depending therefrom, said stem having an axially-extending arcuate recess at one side thereof to provide a pair of opposed side walls, and each of said side walls adjacent the outer end of said stem having a passageway extending transversely therethrough, said passageways being coaxially aligned one with the other and extending transversely through each of said side walls.

3. A fishing line control attachment for a fishing rod comprising a substantially T-shaped member having a crosshead and a stem depending therefrom intermediate its ends, said stem flaring outwardly towards its outer end and having an arcuate axially-extending finger-receiving recess formed in a side thereof to provide a pair of opposed side walls, each of said side walls having a fish-line passageway extending transversely therethrough, and said passageways being aligned one with the other.

4. A fishing line control attachment for a fishing rod comprising a substantially T-shaped member including a crosshead and a stem depending therefrom intermediate its opposed ends, the outer end of said stem being asymmetrical and lobe-shaped in configuration, said outer end of said stem having an arcuate axially-extending finger-receiving recess formed in the side thereof to provide a pair of outwardly diverging side walls, each of said side walls having a passageway extending transversely therethrough, and said passageways being aligned one with the other to receive said line therethrough.

5. An attachment for a fishing rod having a spinning reel mounted thereon, said fishing rod having a handle disposed forwardly of said reel, said attachment comprising a substantially T-shaped member including a crosshead and a stem depending therefrom intermediate its opposed ends, means releasably securing said crosshead to said handle forwardly of said reel with said stem disposed in the path of movement of a fishing line as the same is dispensed from said reel, said stem having a digit receiving arcuate recess formed in a side thereof to provide a pair of oppositely disposed outwardly diverging side walls, and each of said side walls having a transversely extending passageway formed therein to threadedly receive said fishing line therethrough, said passageways being aligned one with the other.

References Cited in the file of this patent

UNITED STATES PATENTS 468,227    Pflueger  ---------------- Feb. 2, 1892

FOREIGN PATENTS 1,116,675   France  ---------------- Feb. 6, 1956